July 21, 1964 C. G. HARD 3,141,853
METHOD OF REGENERATING A SPENT ACRYLONITRILE
SYNTHESIS COPPER CATALYST
Filed June 18, 1959
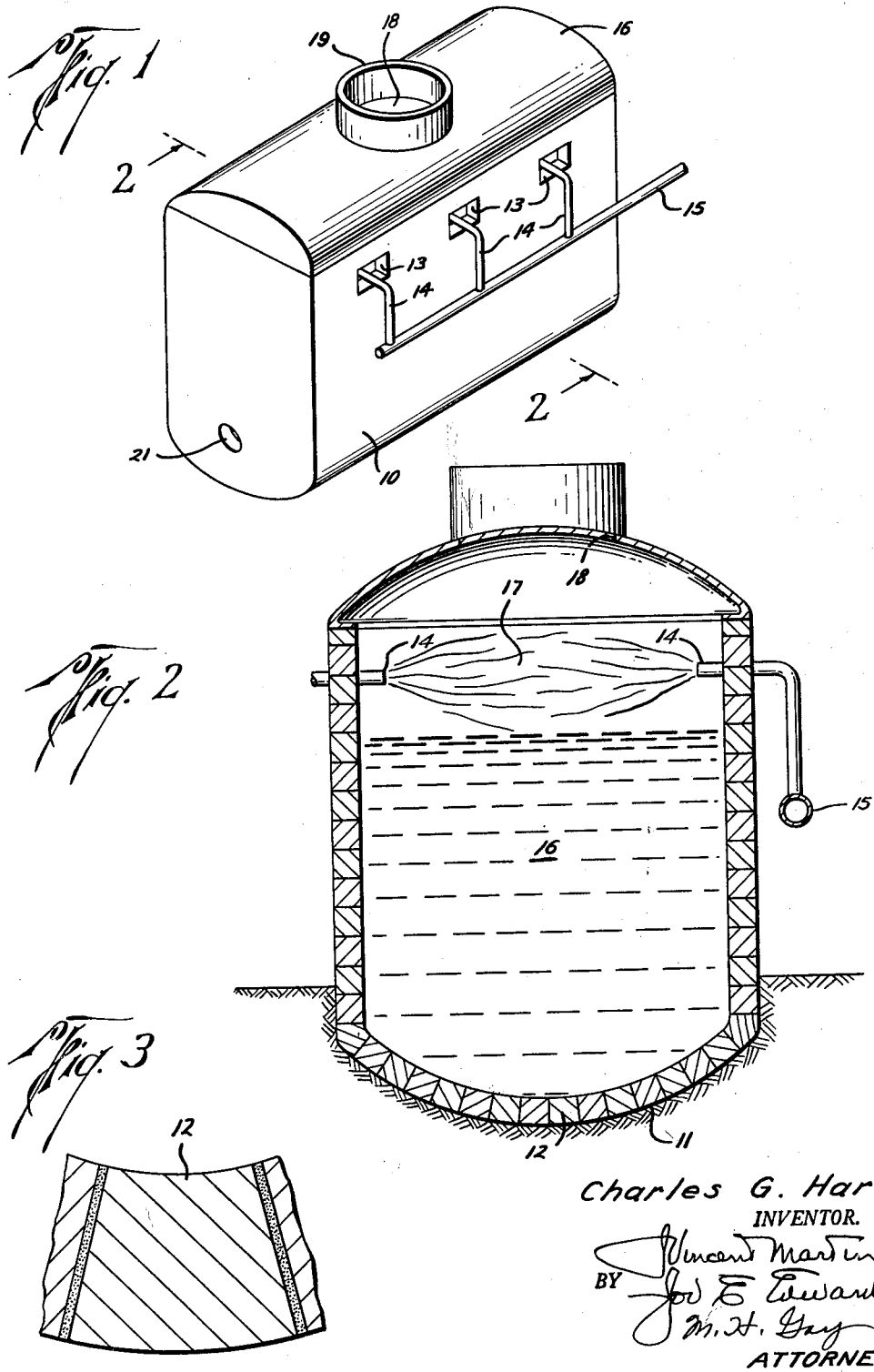
Charles G. Hard
INVENTOR.
BY
ATTORNEYS 3,141,853
**METHOD OF REGENERATING A SPENT ACRYLO-
NITRILE SYNTHESIS COPPER CATALYST**
Charles G. Hard, Houston, Tex., assignor to Lowe Chemical Company, a corporation of Texas
Filed June 18, 1959, Ser. No. 821,233
2 Claims. (Cl. 252—416)

This invention relates to the regeneration and recovery of copper chloride catalyst.

In many processes a copper chloride catalyst in combination with a solubilizing agent for the copper salt is utilized as a catalyst. Examples of such copper salt catalyst reactions include the production of acrylonitrile by the reaction of acetylene with hydrogen cyanide, the production of acetaldehyde by the reaction of acetylene with water, the production of vinyl chloride by the reaction of acetylene with hydrogen chloride, the production of cyanobutadiene by the reaction of monovinylacetylene with hydrogen cyanide, the production of chloroprene by the reaction of monovinylacetylene with hydrogen chloride. Other numerous similar synthesis reactions are well known in the literature.

The copper chloride may be employed by any desired solubilizing agent. These solubilizing agents include the alkali earth metal halides, the alkali metal halides and quaternary ammonium salts. For example, one catalyst used in the synthesis of acrylonitrile is a cuprous chloride in combination with solubilizing agents of potassium chloride and sodium chloride.

In the use of these copper chloride catalysts, the reaction conditions lead to the formation of by-product impurities including tars, ammonia chloride, etc. With continued use of the catalyst the tars and other impurities build up to a point where the activity of the catalyst solution is so lowered that its usefulness is impaired.

It has been proposed to regenerate copper catalyst, but the methods previously proposed are costly and time-consuming.

It is an object of this invention to provide a process of regenerating copper chloride catalyst which is sufficiently economical to make its use attractive.

Another object is to regenerate a copper chloride catalyst in which substantially all of the copper values are recovered by removing the tars and other impurities and without the necessity of further treatment of the catalyst after the contaminants are removed except to add copper or solubilizing agents to restore the desired balance of the catalyst and solubilizing agent.

Another object is to regenerate a copper chloride catalyst and in the regeneration process to consume substantially all of the poisonous gases which are liberated to avoid pollution and safety problems.

Another object is to provide a furnace for use in regenerating copper chloride catalyst which will not be destroyed by the process.

Other objects, features and advantages of the invention will be apparent from the specification, drawing and the claims.

In the drawing wherein like reference numerals indicate like parts:

FIGURE 1 is a schematic illustration of a furnace constructed in accordance with this invention;

FIGURE 2 is a view along the lines 2—2 of FIGURE 1;

FIGURE 3 is a view on an enlarged scale of a fire brick from the bottom of the furnace.

It has been found that the catalyst may be freed from impurities, including the tarry bodies, and recovered in a form suitable for reuse by heating the catalyst in an oxidizing atmosphere to a temperature sufficiently high to drive off and oxidize the tars and volatile impurities. For instance, if it is only desired to remove tars and no high-boiling point impurities are present, the melt may be heated to a temperature of about 450 degrees F. to raise the carbon content of the tars to their boiling point. If, on the other hand, there are present high-boiling point impurities which it is desired to remove, the temperature of the melt should be raised to the boiling point of these impurities. For instance, in the production of acrylonitrile by the catalytic reaction of acetylene and hydrogen cyanide in the presence of a copper salt catalyst which is solubilized by potassium chloride and sodium chloride, it is desired to regenerate the catalyst at a temperature of at least 750 degrees F. to remove substantially all of the by-product ammonia chloride present.

Regeneration is carried out in an oxidizing atmosphere, and preferably in a furnace in which at least a portion of the heat is provided by open flames directly above the surface of the melt. It has been found that the carbon compounds and other impurities will be volatilized, oxidized and driven off as a gas. Use of the oxidizing atmosphere prevents the formation of large volumes of tarry semi-solids in the furnace which retains a large amount of the copper compounds and give rise to a serious furnace cleaning problem. Use of the flame above the melt utilizes the necessary heat for raising the temperature of the melt to convert poisonous gases to harmless gases to avoid pollution and health problems.

In the practice of the method disclosed above, the melt is found to be highly corrosive and will destroy the cement between the fire brick of a conventional type furnace. As the cement is eaten away there is formed a cement which will contain the liquid melt. However, as the specific gravity of the melt is about 3, problems were experienced with the brick on the bottom of the furnace floating to the surface of the melt. The weight of the top of the furnace and the side walls above the surface of the melt tends to hold the side walls in place, but the bottom of the furnace will float to the surface of the melt.

The furnace shown in FIGURES 1 through 3 overcomes the problem of holding the bottom of the furnace in position by building the bottom of the furnace 10 in the form of an inverted arc 11, the bricks of which are locked in place by the arc construction. While the bottom of the furnace might be arched in either or both directions, it is preferred to form the arch in the longitudinal dimension of the furnace.

The furnace is provided on each side with ports 13 through which burners 14 extend. These burners are fed by suitable supply gas through conduit 15.

As best shown in FIGURE 2, the burners 13 direct an open flame over the top of the surface of melt 16. This flame, indicated at 17, both provides the necessary heating for raising the melt to the desired temperature and burns the gases driven off from the melt. The furnace is covered with a suitable top 18 to contain the heat and the evolved steam and gases pass off through chimney 19.

After the catalyst has been regenerated, a tap is removed from port 21 in the bottom of the furnace and the regenerated catalyst drawn off. A relatively small amount of non-volatile solid slag is formed during the regeneration and is left in the bottom of the furnace after the regenerated catalyst is withdrawn.

If desired, the process may be carried out continuously by continuously adding spent catalyst to the melt and continuously tapping off regenerated catalyst from a point remote from the point of introduction of the spent catalyst.

*Example*

Commercial production of acrylonitrile by the reaction of acetylene with hydrogen cyanide in the presence of a copper catalyst is presently being carried out. The catalyst chamber has been periodically drained and recharged with regenerated copper catalyst slurry. A typical analysis of the withdrawn spent catalyst whose activity has decreased to a degree where production of acrylonitrile is no longer economical is as follows:

|  | Wt. percent |
|---|---|
| Copper as Cu | 28 |
| Ammonia as NH₄Cl | 4 |
| Water as H₂O | 20 |
| Cyanide as CN⁻ | 1.2 |
| Tar as carbon | 3 |
| Total chlorides as Cl⁻ | 27 |
| Acid as HCl | 1.2 |
| Density, g./ml., 1.88. | |

This spent catalyst is presently being regenerated by charging it into a furnace of the type shown on the drawings and raising its temperature to between 750 and 800 degrees F. While in the furnace the catalyst is dehydrated, the volatile substances are driven off, oxidized and poisonous gases burned, and a small amount of copper-containing slag is formed. This slag will not contain enough copper to make the process uneconomical.

After the melt comes up to temperature, the furnace is tapped and the hot melt directed into a vessel of water which is a solvent for the regenerated slurry. The regenerated slurry will remain in solution so long as the proper balance of solubilizing agent and copper chloride is maintained. Generally speaking, approximately a weight ratio of copper as Cu to total chlorides as CL is maintained greater than nine-tenths to one but less than one and one-half to one.

The dissolved catalyst is then charged into a storage vessel awaiting reuse in the acrylonitrile production system.

A typical analysis of the regenerated slurry is as follows:

|  | Wt. percent |
|---|---|
| Copper as Cu | 32 |
| Ammonia as NH₄Cl | 0.1 |
| Water | 27 |
| Cyanide as CN⁻ | 0.0 |
| Tar as carbon | 0.3 |
| Total chlorides as Cl⁻ | 29 |
| Acid as HCl | 0.0 |
| Density, g./ml., 2.0. | |

Solid regenerated slurry powder may be provided by tapping the furnace onto a cooling receiver to provide a solid salt cake. This salt may then be broken up, crushed and charged to the catalyst chamber for use for commercial production of acrylonitrile. The solid regenerated powder has the same analysis as the regenerated slurry on a water free basis.

The range of analysis of spent catalyst that has been regenerated to approximately the analysis of regenerated slurry given above is as follows:

|  | Wt. percent |
|---|---|
| Copper as Cu | 18 to 32 |
| Ammonia as NH₄Cl | 0 to 20 |
| Water | 15 to 50 |
| Cyanide | 0 to 3 |
| Tar as carbon | 0 to 12 |
| Sodium and potassium chlorides | Remainder |

After the melt has been drained from the furnace and the furnace has been cooled, the slag therein may be removed and, if desired, treated to recover the copper values therefrom.

The foregoing disclosure and description of the invention is illustrative and explanatory thereof and various changes in the process may be made within the scope of the appended claims without departing from the spirit of the invention.

What I claim is:

1. A process for regenerating a spent acrylonitrile synthesis aqueous catalyst solution containing copper chlorides and solubilizing agents for the copper chlorides selected from the group consisting of alkali metal chlorides, together with volatile and tarry impurities which comprises, heating the solution in an oxidizing atmosphere to a minimum of approximately 450 degrees F. with at least some heat applied by direct open fires above the surface of the melt to drive off the volatile and oxidizable impurities, and separating the resulting gases and slag from the melt.

2. A process for regenerating a spent acrylonitrile synthesis aqueous catalyst solution containing copper chlorides and solubilizing agents for the copper chlorides selected from the group consisting of alkali metal chlorides, together with volatile and tarry impurities which comprises; heating the solution in an oxidizing atmosphere to a minimum of approximately 450 degrees F. with at least some heat applied by direct open fires above the surface of the melt to oxidize and drive off the volatile and oxidizable impurities; separating the resulting gases and slag from the melt; and dissolving the hot melt in water.

References Cited in the file of this patent

UNITED STATES PATENTS

| 2,632,737 | Stehman | Mar. 24, 1953 |
| 2,947,706 | Muller et al. | Aug. 2, 1960 |